United States Patent [19]

Durbin

[11] 3,913,735
[45] Oct. 21, 1975

[54] CONTAINER FOR HOLLOW CYLINDRICAL OR GENERALLY TOROIDAL PARTS

[76] Inventor: David R. Durbin, 2024 Culpepper, Dallas, Tex. 75235

[22] Filed: June 22, 1973

[21] Appl. No.: 372,477

[52] U.S. Cl. ............... 206/303; 206/397; 206/444; 206/386
[51] Int. Cl.² .................. B65D 85/02; B65D 85/30
[58] Field of Search .......... 172/350; 206/303, 304, 206/397, 444, 445, 386

[56] References Cited
UNITED STATES PATENTS

| 84,167 | 11/1868 | Brown | 172/350 |
|---|---|---|---|
| 2,664,219 | 12/1953 | Schmidt | 206/386 |
| 2,761,582 | 9/1956 | Moore | 206/386 |
| 3,348,721 | 10/1967 | Trevarrow, Jr. | 220/71 |
| 3,465,875 | 9/1969 | McKelvey, Jr. | 206/444 |
| 3,509,992 | 5/1970 | David et al. | 206/444 |
| 3,524,540 | 8/1970 | Brown et al. | 206/444 |
| 3,736,777 | 6/1973 | Wirth | 206/303 |
| 3,741,433 | 6/1973 | Bentley et al. | 220/94 A |

*Primary Examiner*—William I. Price
*Assistant Examiner*—Douglas B. Farrow
*Attorney, Agent, or Firm*—Thomas L. Cantrell, Esq.; Joseph H. Schley, Esq.

[57] ABSTRACT

Disclosed is a container for hollow cylindrical or generally toroidal parts for facilitating their storage and handling. Typical of such parts are brakes for large jet aircraft. The container includes a base and a hollow cover, and a connecting bolt for securing the parts together. Both the base and the cover include elements for positioning and bearing against the part inside the container. The cover is provided with rolling rings, and a handle may be provided for facilitating rolling the container about. Various lifting means are provided on the base, the cover, and the connecting bolt.

9 Claims, 4 Drawing Figures

U.S. Patent   Oct. 21, 1975   3,913,735
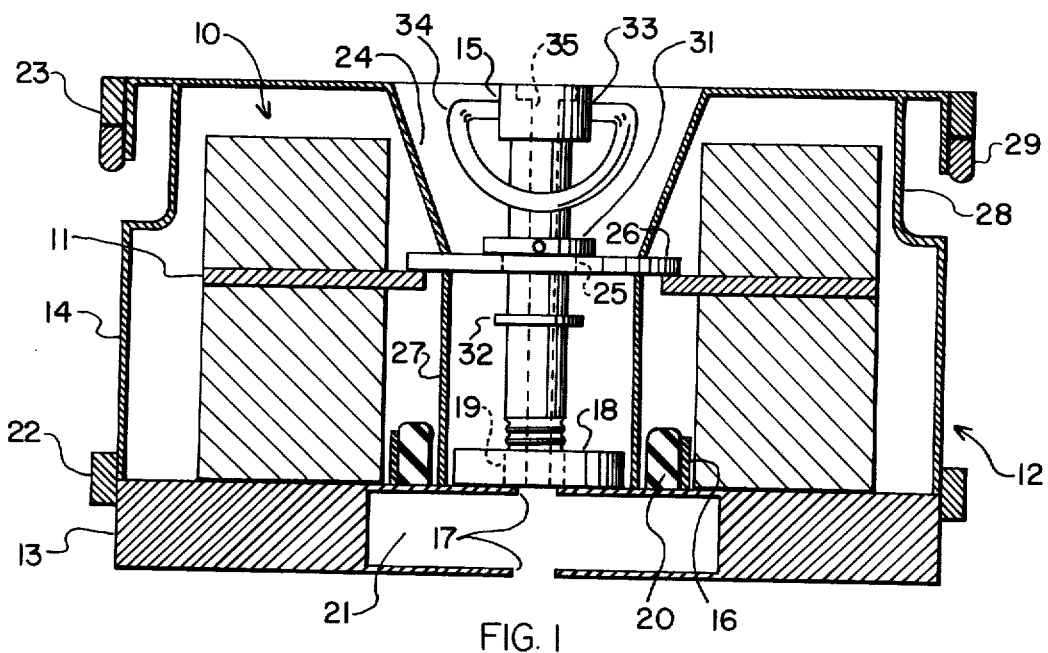
FIG. 1
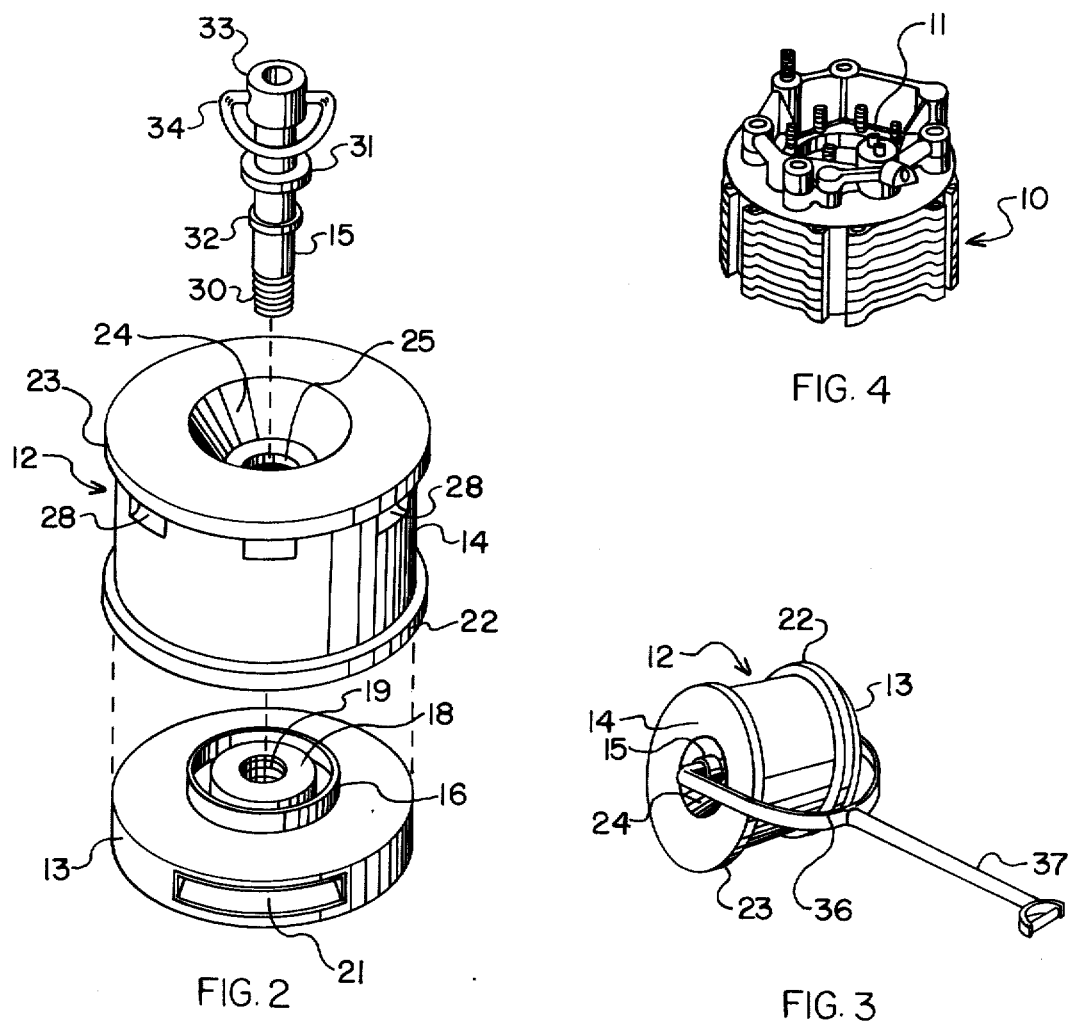
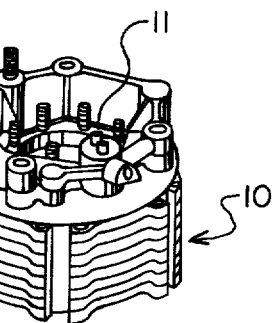
FIG. 4
FIG. 2
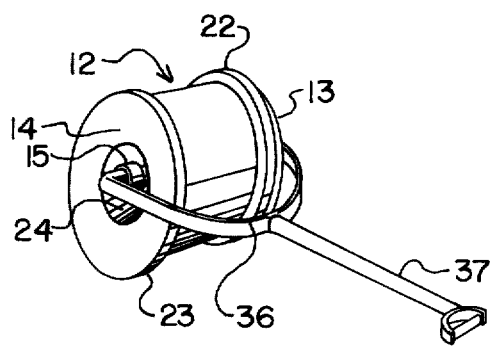
FIG. 3

CONTAINER FOR HOLLOW CYLINDRICAL OR GENERALLY TOROIDAL PARTS

BACKGROUND OF THE INVENTION

Aircraft brakes are an example of a machinery part which is heavy, and at the same time delicate, in that it is precisely dimensioned and is susceptible to damage if mishandled. In the repair and maintenance of large jet aircraft, considerable handling of aircraft brakes is involved. They must be removed from and installed on aircraft, transported from the aircraft to repair shop locations, and stored in parts warehouses. In addition, they must occasionally be transported from one maintenance base to another.

In size, aircraft brakes for large transports are typically about 1½ feet in diameter, and weigh between two and three hundred pounds. In shape, they may be considered relatively flat, thick-walled, open-ended hollow cylinders, or more generally speaking, toroidal. (Other machinery parts are of this general shape also, and the invention is also of utility in the handling of such parts).

Heretofore, to the extent that special packaging containers have been available for aircraft brakes, they have been in the nature of heavy lumber cases or trunks, generally rectangular in configuration, and occasionally provided with a positioning bolt and nut for engaging the brake somewhat in the manner in which a spare tire and wheel is often fixed in position in the trunk of an automobile.

The crates or boxes used heretofore have numerous disadvantages. In the first place, they are very heavy, and when their weight is combined with that of the brakes, as many as four men are required to lift them. Secondly, the heavy brake, which has no good "handles" must be lifted a foot or more manually to be placed in the box by virtue of the high sides thereof, and lifted again, for the same reason, to remove it from the box.

The crates or trunks used in the past, despite their heavy construction, are susceptible to damage in handling, such as broken handles, broken skids, damaged hinges, and broken positioning bolts. In summary, they have all of the weaknesses and disadvantages of rough and ready packing cases, and these are aggravated by the shape and heaviness of the aircraft brakes they must contain.

SUMMARY OF THE INVENTION

In accordance with the present invention there is provided a container for storage and handling of aircraft brakes, and other heavy hollow cylindrical or toroidal parts, which is strong and durable; which can be loaded and unloaded without any significant lifting of the part; which can be easily handled by rolling, and by loading on a fork-lift truck; which is compact and easily stored for stacking; and which provides adequate and reliable protection for the aircraft brake.

The foregoing results are obtained by providing a container having a generally flat cylindrical base of a diameter somewhat greater than that of the aircraft brake it is designed to accomodate. A hollow generally cylindrical cover proportioned to fit on the base is provided. The cover is of a height somewhat greater than that of the brake, and is equipped at its upper and lower edges with rings which serve both as strengthening elements for the cover and as rolling rings, whereby when the cover is tipped on its side, it may be rolled across a floor readily. The lower rolling ring also serves to accurately position the cover on the base. The base is provided with an upstanding annular positioning ring which fixes the aircraft brake in position on the base and functions to help maintain the brake in a fixed position within the container during handling.

The cover of the container is equipped with an internal downwardly projecting part which engages a selected portion of the aircraft brake and urges the brake downwardly against the base of the container. A heavy centrally located connecting bolt is used to fasten the cover to the base and to apply the force required to urge the brake downwardly against the base. The base has a central threaded bore to receive the bolt, and the cover is apertured so that part of the bolt may pass through it.

Several lifting means are provided on the container to facilitate its handling. The bolt is provided at its upper end and with a lifting ring, and in the preferred embodiment of the invention, the cover has a central recess or depression therein into which the lifting ring may be folded so that it is out of the way when containers are stacked. The cover is also desirably provided with recessed hand-holds around the periphery thereof. While other hand grip means may be employed, the recessed hand-holds are particularly desirable because they do not interfere with rolling of the container. The base is provided with a horizontal slot or passage extending through it which is proportioned to accomodate a lifting bar, such as the "tine" of a fork lift truck.

In the preferred embodiment, the beforementioned connecting bolt is hollow so that an axle may be positioned therein. With the container tipped onto its side for rolling, the axle projects beyond both the top and bottom of the container. A yoke may thus be connected to each end of the axle, and with a handle connected to or integral with the yoke, means are thus provided for readily rolling the container from place to place.

From the foregoing it can be seen that the principal object of the present invention is to provide a strong, light, convenient, and easily handled container for heavy hollow cylindrical or toroidal parts, particularly aircraft brakes.

Other objects and purposes, together with the manner in which the foregoing object of the invention is achieved, may be better understood from a consideration of the detailed description which follows, together with the accompanying drawings.

DESCRIPTION OF THE DRAWINGS

FIG. 1 is a sectional elevational view of an aircraft brake container constructed in accordance with the invention, with an aircraft brake, drawn diagrammatically, shown positioned therein;

FIG. 2 is an exploded isometric view of the container of FIG. 1, on a reduced scale, showing the base, cover, and connecting bolt;

FIG. 3 is a somewhat diagrammatic isometric view on a further reduced scale showing the container of the invention tipped on its side into a position so that is may roll, and showing the container equipped with an axle, and a yoke-and-handle device to facilitate rolling; and FIG. 4 is a somewhat diagrammatic isometric view of a typical brake for a large jet transport aircraft, on a scale approximately the same as FIG. 2.

DESCRIPTION OF THE PREFERRED EMBODIMENT

In FIG. 1 an aircraft brake is shown quite diagrammatically in cross-section, while FIG. 4 shows the brake isometrically with more structural details indicated. It is designated generally as 10. The brake 10 is a heavy metal device, machined to precise dimensions, and generally in the shape of a hollow, thick-walled cylinder which is open-ended. Considered more generally, the brake 10 may be viewed as a particular example of a generally toroidal part. The brake illustrated in FIGS. 1 and 4 includes a plate 11 which forms an inwardly projecting flange. Plate 11 is the means by which the brake is attached to the axle of an aircraft landing gear. Substantially all of the brakes commonly employed on large jet transports are equipped with a plate 11 located approximately in the position shown in FIG. 1. This plate is engaged, in accordance with the invention, by a downwardly facing projection of the cover of the container, and the container of FIG. 1 is configured and proportioned to position the projection to meet the plate 11. Those skilled in the art will appreciate that when the invention is to be employed with aircraft brakes not having plates such as 11, or having configurations differing materially from that shown in FIG. 1, the precise shape of the cover of the container and its downwardly oriented projection may be altered to accomodate the particular brake configuration.

In the figures the container of the invention is designated generally as 12. Its three main components are a base 13, a cover 14, and a connecting bolt 15. While various construction materials may be used to make the container, the preferred embodiment employs plate steel for base 13, sheet steel for cover 14, and machinable steel for bolt 15.

As shows best in FIG. 2, base 13 is in the form of a shallow cylindrical plate. The shallowness of the plate is of importance, becuase it facilitates loading and unloading of a brake. With the base 13 positioned beside an aircraft brake, the brake need merely be tipped over onto base 13 as the first step in loading. Base 13 is provided with a centered upstanding keeper ring 16 which is slightly smaller in diameter than the inner diameter of the aircraft brake 10, as can best be seen from a consideration of FIG. 1. Keeper ring 16 aids in the positioning of brake 10, upon initial loading and further acts to hold the brake in the proper position during movement of the container.

Base 13 is centrally apertured, as at 17, and mounted on the base above the aperture is a small cylindrical plate 18 in which is provided internally threaded bore 19. Bore 19 is larger than aperture 17, and is of a size to accomodate the threaded end of bolt 15. It is preferred, but not necessary, to provide a ring of rubber or other elastomeric material, as indicated at 20, in the annular space between keeper ring 16 and plate 18. Rubber ring 20 is taller than keeper ring 16 and thus cushions and protects the brake 10 from marring by ring 16 during the course of loading.

Base 13 is provided with a horizontal passageway or slot 21 which is dimensioned to receive a lifting bar (not shown), such as the tine of a fork-lift truck. One or more containers may easily be skewered onto a single fork-lift truck tine, and once they are engaged on the tine it is impossible for the containers to fall off because of jolting in the course of movement. Nevertheless, the tine can easily be withdrawn from the container upon its arrival at the desired location. Since passageway 21 is a closed walled slot, as opposed to an open groove, it does not detract in the least from the stacking stability of the container 12, because base 13 is still completely flat-bottomed.

Cover 14 is a generally hollow, downwardly open, cylindrical structure which is proportioned to fit on base 13. Its height is slightly greater than the thickness of aircraft brake 10. At its lower edge, there is mounted a peripheral positioning and rolling ring 22. Ring 22 projects downwardly somewhat from the bottom edge of cover 14 and in doing so engages and encircles the top portion of base 13. By this construction, the positioning of cover 14 on base 13 is facilitated, and the construction of the container as a whole is strengthened.

At its upper edge, cover 14 is encircled by another rolling ring 23. Ring 23 serves to strengthen the cover 14 in its upper region, and, as can best be understood by considering FIG. 3, provides in cooperation with ring 22, a relatively low friction means for rolling the container from place to place. The use of rolling rings 22 and 23 ensures that the side walls of cover 14 will not be dented or otherwise damaged in the course of rolling or other types of handling of the container.

Cover 14 is equipped with a central recess or depression 24, the bottom of which is centrally apertured as indicated at 25. As was pointed out above, cover 14 is provided with a downwardly oriented projection which is positioned to bear against an upwardly presented surface of the aircraft brake, namely plate 11. In the preferred embodiment shown in the drawings a plate or flange 26 is employed to serve the dual purpose of functioning as the floor or bottom of recess 24 and the downwardly oriented projection which engages part of the brake. Mounted below flange 26 is a cylindrical extension 27 of the cover 14, which projects downwardly to engage the upper surface of base 13. Extension 27 may be omitted if desired, but it contributes to the strength and stability of the assembled container, and also facilitates positioning of the cover on the base.

Around the periphery of cover 14, there are provided recessed hand-holds 28, by which users may lift the cover 14, or the assembled container 12. Cushion pieces 29 formed of rounded metal bar stock are placed along the upper sides of the hand-holds 28 to protect the user's hands against the danger of injury from the sheet metal edge forming the lip of the hand-hold (see FIG. 1).

Bolt 15 is threaded, as indicated at 30, at its lower end so that it can threadedly engage the internal bore 19 of plate 18 forming a part of base 13. The bolt 15 is of a diameter such that it will pass through aperture 25 in the cover 14. It is provided with an annular flange 31 which, when the bolt is threaded into the base, transmits thrust first to cover 14, and particularly to flange plate 26 thereof, and thence to plate 11 of the aircraft brake, whereby the brake is urged downwardly against base 13 of the container. In this manner, the brake 10 is firmly fixed in position in the container and the base and cover of the container are firmly unified into a single structure. Bolt 15 is also desirably provided with a keeper ring 32 which is installed on it after the bolt is passed through aperture 25 in cover 14. Keeper ring 32 is fixed on the bolt a sufficient distance below flange 31 to allow the bolt to be threaded into and out of the base. Keeper ring 32 prevents the bolt 15 from being separated from cover 14, and thus makes it unnecessary for users of the container to keep track of the bolt separately from the cover.

Bolt 15 is desirably provided with an enlarged upper end indicated at 33, and a D-ring 34 is swivelly fitted into said enlarged portion. D-ring 34, when swiveled upwardly, functions as a lifting ring for the bolt, the bolt and cover, or the container when it is assembled. When D-ring 34 is swiveled downwardly, as illustrated in FIG. 1, it is disposed in recess 24 of the cover 14, and thus does not interfere with the stackability of the containers.

Bolt 15, in accordance with a preferred form of the invention, is provided with an axial bore 35, which, when the bolt is threaded into the base, is aligned with aperture 17 of the base 13. In this manner, provision is made to install an axle through the bore 35 and aperture 17. The axle (not shown) is preferably somewhat longer than the overall height of the container so that when it is installed, part of it projects from either end. As is shown in FIG. 3, a yoke 36 having a handle 37 may conveniently be mounted to the ends of the axle. When the container is equipped with a yoke and handle as shown in FIG. 3, it may easily be rolled from place to place by pulling or pushing, somewhat in the manner of a lawn roller. Since the rolling rings 22 and 23 provide a relatively low friction engagement with the floor across which the container is being rolled, steering is easily accomplished.

From the foregoing it can be seen that in accordance with the invention, a greatly improved storage and transportation container for aircraft brakes and other objects of the same general character is provided.

What is claimed is:

1. A generally cylindrical and hollow reinforced container for the loading, storage, lifting, rolling and handling of relatively large and heavy generally toroidal parts comprising:
   a generally flat, reinforced cylindrical base having a diameter greater than that of the part for the lateral underlying support and securement thereof, and having a relatively narrow profile for facilitating the positioning of the part thereon;
   said base having a centered upstanding keeper-ring of relatively shallow height mounted thereto for facilitating the loading of the part thereon and its secured positioning during rolling and handling;
   said ring being of smaller diameter than the inner diameter of the part;
   said base further having a threaded bore formed centrally therein of relatively shallow height for facilitating the loading and securing of the part therearound;
   a hollow generally cylindrical cover proportioned to fit on said base, of a height greater than the thickness of the part;
   first and second ring elements circumferentially formed in spaced relationship around said cover, said ring elements having substantially equivalent diameters greater than that of the cover for providing a means for the handling and rolling of said part when positioned therein;
   said first ring element formed around the lower edge of said cover and projecting downwardly therefrom for engaging said base when positioned thereon, and providing a reinforcing structure to facilitate the rolling of the part when positioned therein;
   said second ring element formed around the upper edge of said cover providing a reinforcing structure for said cover and gripping means for tipping said cover onto its side for the rolling thereof upon said first and second ring elements therearound;
   said cover further being provided with a downwardly oriented projection positioned to bear against an upwardly presented surface of the part when it is positioned upon said base and within said cover for securing the part therebetween;
   said cover further being centrally apertured in axial alignment with said threaded bore of said base when said cover is placed over it;
   and an elongated connecting bolt having a threaded portion upon one end suitably formed for engagement with said threaded bore in said base, said bolt having a portion distant from said threaded portion configured to engage and bear upon a portion of said cover when said bolt is positioned to pass through said aperture, therein securing said cover against said part and said base for the lifting and rolling transport thereof.

2. A container in accordance with claim 1 and further comprising a lifting ring attached to an upper portion of said connecting bolt for the raising of said base and the part laterally supported thereby.

3. A container in accordance with claim 2 in which said cover is provided with a central recess and said lifting ring is disposed in said recess to provide a substantially flat top surface for stacking said containers one on another.

4. A container in accordance with claim 1 in which said cover is provided with a central recess and the downwardly oriented projection of said cover is an annular flange encircling said recess and positioned to selectively engage an annular portion of the part to urge it downwardly against said laterally supporting base.

5. A container in accordance with claim 1 in which said base has a horizontal passage therethrough proportioned to accomodate a lifting bar.

6. A container in accordance with claim 1 in which said bolt has an axial bore therethrough and further comprising an axle positioned in the bore of said bolt, a yoke, the ends of which are connected to the ends of said axle, and a handle on said yoke for applying a force to the container to roll it on said rolling rings.

7. A container in accordance with claim 1 and further comprising recessed hand-holds spaced around the periphery of said cover.

8. A container in accordance with claim 1 and further comprising an annular downwardly projecting extension on said cover of a length sufficient to engage said base and of a diameter smaller than the inner diameter of said part.

9. A generally cylindrical, reinforced container for the storage, rolling, handling and manual transport of a heavy generally toroidal part comprising:
   a generally flat, reinforced cylindrical base and a hollow generally cylindrical reinforced cover proportioned to fit on said base, the base and cover together enclosing and laterally supporting said part accross its annular bottom surface;
   said cover having means engaging said base to prevent displacement of said cover laterally with respect to the base and inwardly projecting means engageable with said part for bearing thereagainst to prevent displacement thereof away from said base during handling;

said base having means engageable with said part to restrain displacement thereof laterally with respect to the base, said means having a relatively shallow height with respect to said base for facilitating the loading of the part thereon;

a central bolt connecting said cover to said base and forming a central upright axis of said container for and exerting a centric fixing force on said part through the inwardly projecting means of said cover, whereby to unify said base and cover into a single protective structure with the part firmly fixed therein; and a pair of ring elements circumferentially formed in parallel spaced relationship around said cover and extending outwardly therefrom reinforcing and providing for the handling and rolling of said container about said central axis facilitating the manual transport of said part.

* * * * *